Dec. 25, 1928.  F. L. O. WADSWORTH  1,696,222
TEMPERATURE CONTROL FOR WATER HEATERS
Filed May 19, 1923   2 Sheets-Sheet 1
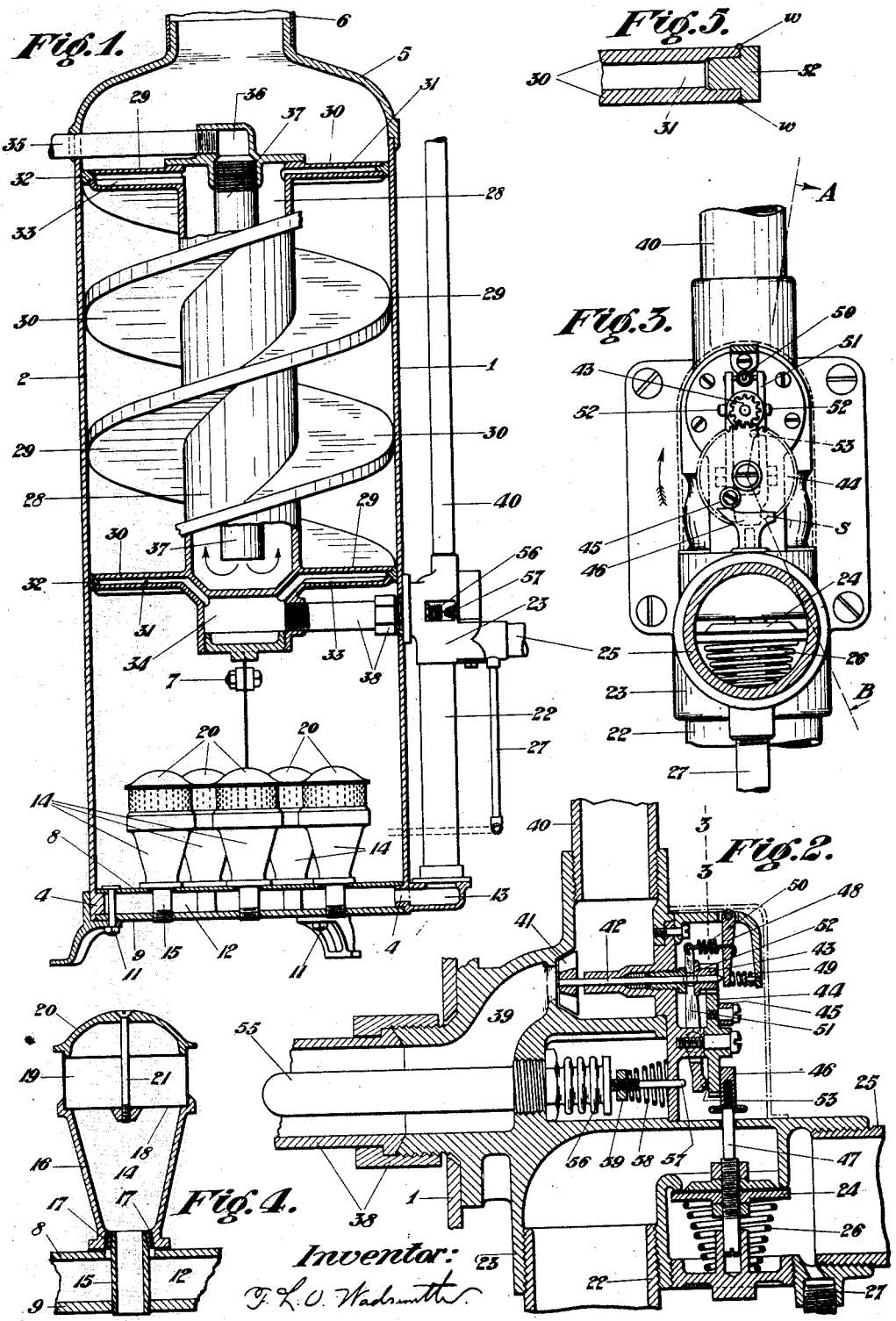
Inventor:
F. L. O. Wadsworth

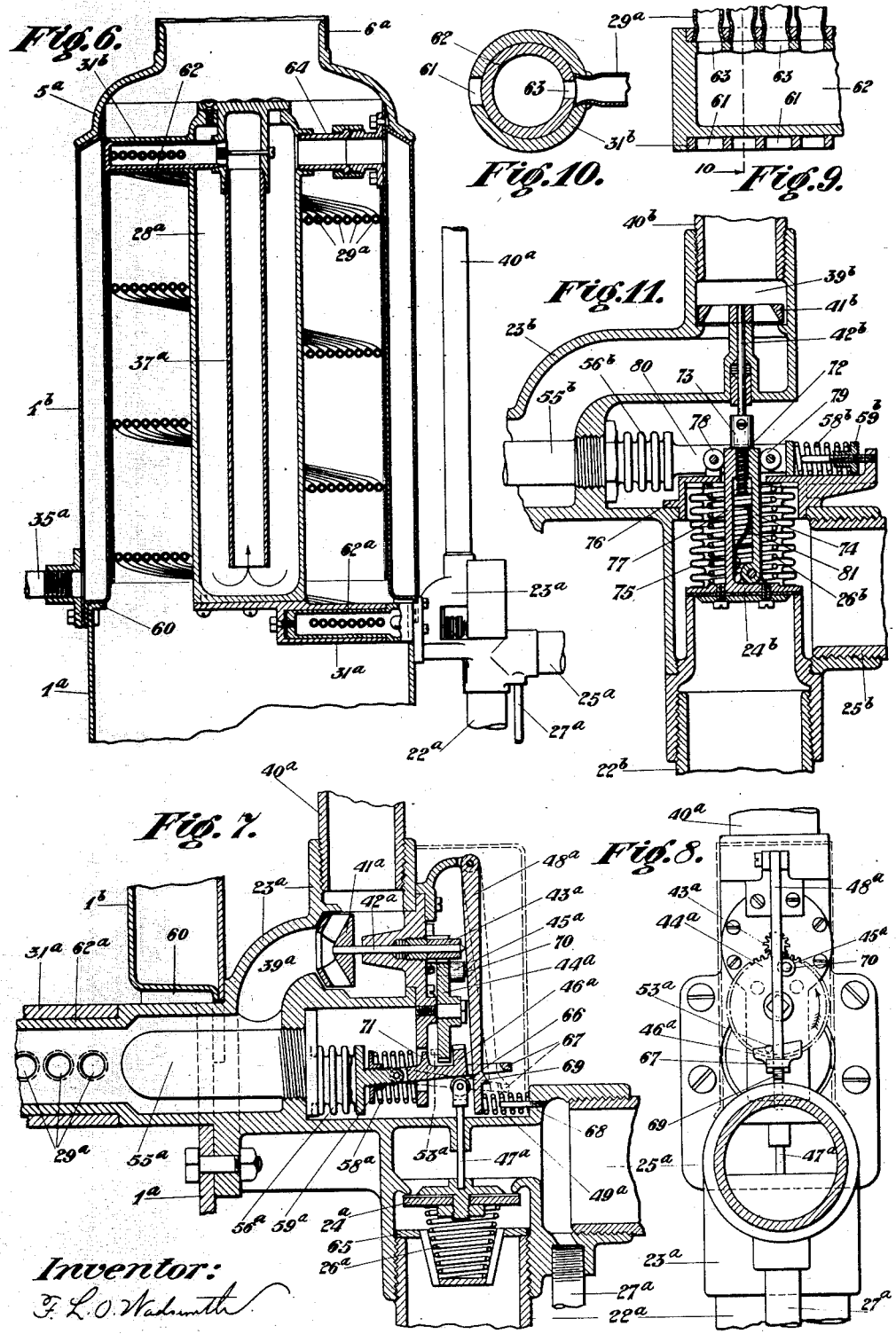

Patented Dec. 25, 1928.

1,696,222

UNITED STATES PATENT OFFICE.

FRANK L. O. WADSWORTH, OF PITTSBURGH, PENNSYLVANIA.

TEMPERATURE CONTROL FOR WATER HEATERS.

Application filed May 19, 1923. Serial No. 640,079.

My invention relates to water heaters that are provided with a temperature control by which the fuel supply to the heater burners is automatically regulated by the flow, and by the temperature, of the liquid within the heater; and the generic purpose of my invention is to produce a heater construction of this character which is simple in form, certain and reliable in action, and economical in operation. Another general object of the present improvements is to provide a form of automatic control mechanism, in which the fuel supply valve is actuated, at the proper times, by the substantially uninterrupted flow of the liquid through the heater pipes, and without the use of any cylinders and pistons, or other volumetrically variable pressure chambers, in which portions of this liquid may remain at rest and deposit sediment etc.

A more specific object of my invention is to provide means by which the turning on, or cutting off, of the fuel supply is effected by the action of a rotary motor, which may be positioned in either the outlet passage from the heater, or in the inlet passage thereto; and which is controlled in its movements—or in its times of movement—by the expansion and contraction of a thermostatic device in the outlet passage. A particular feature of this improved control mechanism is the substantially instantaneous and complete opening, or complete closing, of the fuel supply valve, by the movement of the rotor element, whenever the flow of liquid is started or stopped, and whenever the temperature of the outflowing liquid falls below, or rises above, a predetermined point.

Another specific feature of this invention is the provision of a flow actuated motor which has a combined rotary and reciprocating motion, and the provision of connecting means whereby the desired movements of the fuel control valve are effected in part by the reciprocation, and in part by the rotation, of the said motor; and the further provision of means whereby the said valve may be immediately closed, independently of, and without assistance from, the said motor (or, if closed, may be positively prevented from opening) whenever the water in the apparatus is heated above a certain preadjusted temperature. This last specified feature of my improvements prevents any injury to the parts exposed to the heating burners even when the flow actuated motor-valve-connections are out of order or are prevented from operating in their normal manner.

Other special features and advantages of my present invention will be recognized and appreciated, by those skilled in this art, from the following more detailed consideration of certain illustrative embodiments thereof, that are depicted in the accompanying drawings, in which:

Fig. 1 is a front view, in partial section on the central plane, of one exemplification of my improvements; Fig. 2 is an enlarged sectional view of the valve control mechanism of this construction; Fig. 3 is an end view of the structure shown in Fig. 2 with a small portion of the mechanism broken away on the plane 3—3 of that figure and with the parts thereof in another position; Fig. 4 is a detail sectional view of one of the heating burners shown in Fig. 1; Fig. 5 is an enlarged sectional detail of another part of this same temperature; Fig. 6 is a partial section, and partial front elevation, of another embodiment of my present improvements; Fig. 7 is an enlarged sectional view of the control mechanism used in this second construction; Fig. 8 is an end view of this mechanism; Figs. 9 and 10 are enlarged sectional views of a part of Fig. 6; and Fig. 11 is a sectional elevation similar to those of Figs. 2 and 7, and illustrates a third form of control device which may be used as an alternative, or substitute, for either of the mechanisms there shown.

In the organization illustrated on the first sheet of drawings (Figs. 1 to 5) the heater shell comprises two semi-cylindrical members 1 and 2, which are provided, at their lower ends, with inwardly projecting ribs 4, and which are held together, at their upper ends, by a one piece cap 5 that carries the discharge flue pipe 6. The members, 1, 2, are also held in assembled relationship by the lugs and lug bolts 7, and by the circular base plates 8—9, which are clamped against the opposing edges of the ribs 4 (by means of the foot bolts 11) and which form therewith a shallow drum or chamber 12 that is in communication with a flanged box 13 on the side of the shell 1. This drum 12 serves as a support for a cluster of seven symmetrically disposed heating burners, 14, each of which comprises a hollow stem 15 that is screwed into the lower plate 9, and a mixer tube 16 that is threaded over the free upper end of the stem 15 and screwed down thereon until its lower flanged end is in sealed contact with the upper plate 8. The enlarged base of the mixer tube 16 is provided with one or more fine perforations 17 (see Fig. 4) which afford communication between it and the drum chamber 12; and the upper end of the said tube is covered with a sheet of gauze 18 that is clamped in place thereon by the cylinder of perforated sheet metal 19, the cap 20, and the cap screw 21.

The box 13 is connected, by means of the flanged conduit 22, with a casing 23, which contains a downwardly opening valve 24, that is normally held in closed position—to shut off communication between the conduit 22 and a lateral supply pipe 25—by the spring 26. The casing 23 is also provided with a bye-pass connection 27 which leads directly to a pilot light that is located in proximity to one of the main heating burners 14. When the valve 24 is opened—in the manner later described—the gas in the supply pipe 25 is admitted to the conduit 22 and the drum 12, and passes through the perforations 17 into the tubes 16, where it is mixed with air that is aspirated or drawn through the stems 15; and the mixed gas and air is discharged through the protecting screens, 18, and the perforated cylinders 19 and ignited by the flame of the constantly burning pilot light.

The water heating element is located above the burners 14—in the upper half of the shell 1, 2—and consists, in this case, of a central tubular member 28 which is encircled by two hollow spiral ribs, 29 and 30 that may, as here shown, be formed or cast as an integral part of the central member, or may be separately constructed and attached, in any suitable way, to the said member. In the particular form of construction illustrated in Figs. 1 and 5, each rib consists of two thin webs that are spaced apart to form a narrow rectangular slot 31, which is closed at its outer edge by a T-shaped strip of metal 32 that is wound tightly into and against the outer edges of the slot and the rib, and is also secured thereto by brazing or welding the contiguous faces of the assembled parts (as indicated at w, w, Fig. 5). The ends of the ribs 29 and 30 are closed, and are also preferably widened or flared out to form somewhat enlarged openings (as indicated at 33, 33, Fig. 1) which communicate, at the upper ends of the ribs, with the chamber in the central member 28, and which open, at the lower ends thereof, into a separate chamber 34, at the base of this tubular member. The upper chamber is connected with the cold water supply pipe 35 by the angle fitting 36 and the tube 37; and the lower chamber (34) is connected—by means of the nipple and union 38—with a discharge opening 39 in the casing box 23 (see Fig. 2). The opening 39 is connected, at its outer end, with the hot water service pipe 40 which serves to conduct the heated water to the point, or points, where it is used. When a tap is opened in this pipe, the water flows, through the connections 35—36—37, to the lower end of the tubular member 28, thence upwardly through said member to the upper ends of the rectangular passage ways 31—31 in the ribs 29—30, then spirally downward through these passage ways to the lower chamber 34, and thence outwardly through the connections and conduits 38, 39 and 40 to the point of discharge.

The establishment of the flow of water through the heater elements and connections automatically opens the fuel supply valve 24, by the action of the improved flow-controlled mechanism that is shown in enlarged detail in Figs. 2 and 3. In the form there depicted, this valve actuating device comprises a rotary-reciprocable turbine element 41 which is placed at some suitable point in the passage way 39, and which is mounted on a shaft 42 that passes through a stuffing box in the side of the casing 23 and carries, at its outer end, an elongated pinion 43. This pinion meshes with a spur gear 44, which is provided with a roller 45, that is adapted to engage with the cam 46 on the upper end of the fuel valve stem 47, and thereby move the valve downwardly, or away from its seat, as the said gear revolves. The rotatable elements 41—42—43 are pressed inwardly—and when inactive are held in the position shown in Fig. 2—by means of the arm 48 and the compression spring 49. The arm 48 is also connected, by the tension spring 50, to the upper end of a U shaped lever 51, which straddles, and is pivotally mounted on, the hub support of the gear 44. The arms of the lever 51 are provided with inwardly projecting pins 52—52, which bear on the adjacent flanged end of the pinion 43; and the head of this lever is provided with a slightly offset boss that is adapted to engage the pin 53 on the inner side of the gear 44. In the inactive position of the mechanism the lever 51 is prevented from moving outwardly by the contact of the pins 52 with the flanged pinion 43; and the gear 44 is then prevented from rotation—in the direction of the arrow of Fig. 3—by the engagement of the pin 53 with the head of the lever 51 (as shown in full lines in Fig. 2 and in dotted lines at S, Fig. 3). But when water begins to flow through the passage way 39 the turbine member 41 is pressed outwardly, against the resistance of the spring 49; and the lever 51 is concurrently rocked, in the same direction, thereby moving its head out of the path of the pin 53; and the gear 44 can then be rotated, by the action of the turbine wheel 41 and the pinion 43, until the roller 45 engages the cam head 46 and presses it down to the position shown in Fig. 3—thereby quickly opening the valve 24 to its full extent. The rotation of the parts, 41—43—44—45 etc., is then arrested (before the roller 45 has cleared the left hand end of the cam 46) by the engagement of the pin 53 with one of the arms of the U shaped lever 51; and the valve 24 is then maintained in its fully opened position as long as this engagement of the parts 51—53 continues. But as soon as the flow of water is stopped, or nearly stopped, the outward thrust on the rotor 41 is relieved and the connected and associated elements 42—43—51 are moved inwardly (by the action of the spring 49), thus releasing the contact of the lever arm with the stop pin 53, and permitting the gear 44 to be again revolved, in part by the action of the turbine 41, and in part by the upward thrust of the spring pressed valve and its cam 46, on the roller 45. This movement carries the roller 45 to one side of the cam 46, and the valve 24 is then immediately "snapped" shut by the spring 26. The rotary movement of the gear 44 may continue after this closing of the valve; but it will be again arrested, when the revolving parts have once more reached the position of Fig. 2, by the engagement of the pin 53 with the head of the lever 51.

The valve control mechanism just described is also arranged to either cut off or to turn on the supply of fuel whenever the constantly flowing stream of water successively rises above and falls below a predetermined temperature. In order to effect this temperature control, I provide a thermostat member 55, which is preferably positioned in the pipe connection 38, and which is arranged to press the lower head of the lever 51 outwardly as the temperature rises. In the form shown in Figs. 1 and 2 this thermostat consists of the rigid bulb element 55 and a flexible "sylphon" bellows 56, partially filled with a volatile liquid which "boils" at a temperature approximating that desired. The outer end of the bellows 56 is provided with a threaded stud 57 which is adapted to engage the head of the lever 51; and the expansion of the bellows, under the vapor pressure in the thermostat, is resisted by a spring 58 whose tension can be varied by the nut 59 on the stud 57. The parts are so adjusted that when the flowing water reaches the predetermined temperature of "cut off" the lever 51 will have been moved from the "open" position of Fig. 3 to the "shut" position of Fig. 2 (without necessarily altering the position of the outwardly pressed rotor members 41—43), thereby moving the upper arms of this lever out of the path of the stop pin 53; and the gear 44 will then be rotated—through the angle A to B (Fig. 3)—to break the engagement the roller 45 and the cam 46 and permit the valve to be closed by the spring 26. When the temperature of the flowing water once more falls below this point of automatic "cut-off", the stud 57 will be retracted; and the lever 51 will be rocked outwardly, by the spring 50, until its head is withdrawn from the path of movement of the pin 53; after which the gear 44 will be again rotated—through the angles B to A (Fig. 3)—to once more fully open the valve 24.

The complete operation of the above described heater organization will now be readily understood by those skilled in the water heater art. When there is no flow of water in the system the valve 24 is held closed by the spring 26, and the gear 44 is locked in the position shown in Fig. 2, by the engagement of the pin 53 with the head of the U-shaped lever 51. When the flow of water is started the turbine member 41 is first moved outwardly by the velocity pressure on its entry side and the head of the lever 51 is thus moved out of engagement with pin 53. The gears 43—44 are then rotated by the action of the flowing water on the turbine blades; the valve 24 is opened by the action of the roller 45 on the cam 46; and the parts are locked in the position of Fig. 3 by the engagement of the pin 53 with one of the arms of the lever 51. The opening of the valve 24 allows the fuel to flow from the supply pipe 25 to the burners 14—where it is ignited by the constantly burning pilot light—and the heated gases of combustion pass upward, through the helical passages between the spiral ribs 29—30, and impart their heat to the reversely flowing currents of liquid in the central chamber 28 and the conduits 31—31. When the temperature of this flowing water has been raised to a predetermined point—which may be varied by altering the tension of the spring 58—the expansion of the thermostat elements 56—57 will return the lever 51 to the position shown in Fig. 2; thereby releasing the pin 53 from its engagement with the upper part of this lever and permitting the gear 44 to be revolved, by the turbine element 41, until the said pin contacts with the lower head of the said lever (as shown in Fig. 2 and as also indicated at S in Fig. 3). In this movement the valve 24 is released—by the disengagement of the roller 45 from the cam 46—and is "snapped" shut by the spring 26; thus cutting off the supply of fuel from the heating burners. The temperature of the still flowing water will then quickly drop; and the resultant contraction of the thermostat member 56 will allow the lever 51 to be moved forward by the spring 50, thereby unlocking the gear 44 and permitting it, and its associated parts, to be rotated to the position of Fig. 3. This will admit a fresh supply of fuel to the heating burners; and the previously described cycle of operations will be repeated as long as the water continues to flow and to be successively heated above, and cooled below, the desired temperature. When the flow of water is stopped the immediate equalization of pressure on the two sides of the turbine member 41 will permit the spring 49 to return the rotary reciprocable member to its inactive position. If the valve is, at this time, in its closed position it will remain in that position; but if it is open (as shown in Fig. 3) the inward movement of the parts 41—42—43 will carry with them the lever 51 and thus release the upper engagement of the pin 53 with this lever. The gear 44 will then be revolved, and the valve 24 allowed to close, either by the rotation of the turbine 41, or—if the water has stopped flowing before the release occurs—by the action of the spring 24 alone. In this last contingency the gear 44 may not be rotated through the complete closing angle, A to B, but this is immaterial; as the next opening movement will carry the pin 53 back to the angular position A (Fig. 3).

Each complete cycle of valve movement involves one revolution of the gear 44; but the angle B to A, through which the pin 53 moves in opening the valve, is preferably larger than the complementary angle, A to B, in order to obtain an increased acceleration of the rotating parts during the opening movement. The initial angular acceleration of the gear 44—preceding the engagement of the roller 45 with the cam 46—cooperates with the pinion-gear reduction ratio in augmenting the effective action of the turbine element 41; and enables a very small rotor member to overcome the resistance of a relatively powerful valve spring 26. The ratio between the angular movements, A—B and B—A, may be varied, as desired, by changing the form of the head, or of the arms, of the lever 51; and the gear reduction ratio 43—44, may also be altered to best meet special conditions of water flow, etc., without changing, in any way, the essential and characteristic mode of action of the mechanism.

Figs. 6 to 10 inclusive depict another illustrative embodiment of my present improvements. In this exemplification the heater shell is formed in two vertically superimposed sections $1^a$ and $1^b$. The lower section $1^a$ consists of a cylindrical casing, which carries, at the bottom, a fuel drum and a cluster of burners similar to those shown in Figs. 1 and 4, and which is provided at the top with an inturned flange 60 that supports the upper section $1^b$. This top section consists of an annular sheet metal reservoir, which is connected at its lower end with the cold water inlet, or supply, pipe $35^a$, and which is covered by the cap $5^a$ that carries the chimney flue $6^a$.

The heat absorbing elements of this organization comprises a central reservoir $28^a$ and an assemblage of thin metal tubes $29^a$ which are wound in parallel relationship to form a helically shaped coil, and are coupled, at their ends, to the manifold heads $31^a$ and $31^b$ that project from the sides of the central reservoir $28^a$. The individual tube elements may be all of the same internal diameter (as here shown); or they may be made of progressively increasing size (as the radius of winding increases) and their ends are connected to the manifolds $31^a$ and $31^b$ either by means of internal nipples brazed or welded to the connected parts, or in the manner shown in enlarged detail in Figs. 9 and 10. In the construction there shown the ends of the tubes $29^a$ are slightly reduced in diameter and are inserted in internally beveled holes in the wall of the manifold $31^b$ (or $31^a$). The ends of the tubes are then expanded—by the use of an ordinary boiler tube expander that is inserted through holes 61, 61 etc. in the opposite wall of the manifold—and the expanded ends are then sealed in place by a slightly tapered inner sleeve 62 which is fitted tightly into the manifold opening and is provided with ports 63, 63, etc. that register with the ends of the tubes $29^a$. The inner end of the upper manifold head $31^b$—or of its associated sleeve 62, if the latter is used—is connected to a central tube $37^a$ that is sealed into the top of the reservoir $28^a$ and extends downwardly to a point near the bottom thereof; and the outer end of the lower manifold $31^a$, or of its associated sleeve $62^a$, is coupled to, or forms a part of, the hot water discharge and control valve casing $23^a$. After the parts $28^a$—$29^a$—$31^a$—$31^b$ ($62$—$62^a$), $37^a$ and $23^a$, have been assembled in the above described manner, the complete unit is preferably dipped in a bath of molten zinc or tin, in order to fill any interstices between the contiguous sides of the tubes $29^a$, and to unite the latter into a substantially rigid spiral coil. The assembled elements are then tested under suitable hydraulic pressure and any leaks are closed by local brazing or welding.

The completed heating unit is held in position in the upper end of the shell $1^a$ by bolting the flanged side of the casing $23^a$ against the outer face of the shell; and the superimposed annular reservoir $1^b$ is joined to the upper end of the inner reservoir $28^a$ by means of suitable nipple and union connections 64. The water discharge opening in the casing $23^a$ is connected to the service pipe $40^a$; and the lower portion of this casing—which contains the fuel valve—is coupled, on one side, to the gas supply pipe $25^a$, and, on its adjacent side, to the conduit $22^a$ that leads to the burner assemblage in the lower part of the heater shell $1^a$. The supply pipe opening is also connected with a suitable pilot light in the burner chamber by means of the smaller conduit $27^a$.

The control of the fuel supply to the main burners of the last described organization can be effected by the same mechanism as that used in conjunction with the heater shown in Fig. 1; or it may be accomplished by means of the alternative mechanisms illustrated in Figs. 7 and 8 or in Fig. 11. In the construction depicted in Figs. 7 and 8, the main valve 24ª is positioned in the outlet opening which receives the discharge conduit 22ª, and is normally held closed by a spring 26ª that is supported, in a skeleton basket 65, on the upper end of this conduit. The valve stem 47ª projects upwardly through the adjacent wall of the casing 23ª, and is provided, at the top, with a roller 66, which is engaged by the lower edge of a lever 67 that is pivotally mounted on the outer end of a vapor thermostat element 55ª—56ª. The lever 67 carries an upwardly projecting cam 46ª which is adapted to be engaged by a roller 45ª on the face of a gear 44ª; and this gear is in mesh with a pinion 43ª which is mounted on the outer end of a shaft 42ª, that carries a rotary-reciprocable-turbine element 41ª. The member 41ª is positioned in the center of the discharge opening 39ª, which leads from the interior of the sleeve 62ª to the lower end of the service pipe 40ª; and the outward thrust of the flowing water on the face of the turbine is resisted by an arm 48ª, and a compression spring 49ª interposed between the lower end of this arm and a ledge on the face of the casing 23ª. The arm 48ª moves in a slot at the outer end of the lever 67; and is limited in its outward movement by an adjustable stud 68 (as shown in dotted lines in Fig. 7); and the front edge of this member is provided with a lug 69 that is adapted to engage with the closed end of the slotted lever. The pin support for the roller 45ª is provided with a projecting head 70 which is adapted to engage with the side of the arm 48ª, when the latter is in its inner, or static, position as shown in full lines in Fig. 7; and the inner face of the gear 44ª carries a second stop pin 53ª which is diametrically opposite the roller 45ª, and which is adapted to engage with a lug 71 on the lever 67 when the latter is moved outwardly by the expansion of the thermostat bellows 56ª.

The operation of the valve control mechanism last described, is as follows: When no water is flowing through the heater the turbine member 41ª is held in the position shown in Fig. 7 by the action of the spring 49ª on the arm 48ª; and the gear 44ª is prevented from rotating—in the direction of the arrow of Fig. 8—by the engagement of the head 70 with the arm 48ª. But when a tap, or other outlet, in the service pipe 40ª is opened, and water begins to flow through the heater pipes and passages, the turbine-shaft elements 41ª—42ª, and the arm 48ª, are moved outwardly a sufficient distance to release the pin or head 70; the gear 44ª is revolved, by the clockwise rotation of the turbine element, until the roller 45ª is brought into engagement with the cam 46ª; and the lever 67 is thereupon rocked downwardly—thereby fully opening the valve 24ª—and locked in its depressed position by the engagement of its outer end with the lug 69. The turbine-gear-members may then continue to revolve freely—without affecting the position of the valve connections—until the flow of water is stopped or the temperature of the flowing water rises above the predetermined point of thermostatic "cut off." If the water flow is arrested, the velocity pressure on the entry side of the turbine member 41ª is at once removed, and the arm 48ª will be restored to its initial full line position by the spring 49ª, thus releasing the lug 69 from its engagement with the lever 67 and permitting the valve 24ª to be "snapped" shut by the spring 26ª; or, if the temperature of the flowing water rises above the desired point—which may be varied by the adjustment of the spring and nut 58ª, 59ª—the expansion of the thermostat 55ª—56ª will move the lever 67 outwardly until its end is released from the lug 69; and the valve will then be likewise closed by the pressure of the spring 26ª. The successive outward and upward movements of the lever 67 will bring the lug 71 into the path of movement of the pin 53ª; and the rotation of the gear 44ª will be stopped before it can again open the valve. The parts will remain in this closed and locked position—while the water still continues to flow—until the drop in temperature and the resultant contraction of the thermostat 55ª—56ª, will permit the spring 58ª to move the connected lever and lug elements 67—71 out of engagement with the pin 53ª; after which the valve 24ª will be again fully opened, and locked in its open position, in the manner previously explained. The joint and cooperative actions of the velocity pressure, or flow, actuated element 41ª, and of the thermostatically actuated member 56ª—with their associated and interconnected parts—therefore results in a substantially instantaneous and complete opening or closing movement of the fuel supply valve whenever the flow of water is started or stopped, or whenever the temperature of that flowing water falls below or rises above a predetermined and preadjusted point.

Fig. 11 illustrates another simple and effective valve control mechanism which may be used in conjunction with either of the previously described exemplifications of my present improvements (in place of the mechanisms illustrated in Figs. 2 and 3, or Figs. 7 and 8); or which may also be advantageously used in connection with any of the instantaneous hot water heater constructions shown in my earlier patents, or in my copending patent applications; e. g., Pat. Nos. 1,131,021, 1,146,826, 1,156,949, 1,243,017, 1,248,579 and application Ser. No. 610,471, filed Jan. 3rd, 1923, etc. This alternative form of control mechanism comprises a turbine element 41ᵇ, which is mounted, on a vertical shaft 42ᵇ, in the water discharge passage 39ᵇ of the casing 23ᵇ;

and which is connected to the main fuel valve 24$^b$ by means of a threaded stud 72 that is coupled to the lower end of the shaft 42$^b$ by the collar 73 and is adapted to be engaged by the half nut 74 that is pivotally attached to the head of this valve. The latter is mounted on the lower end of a flexible bellows 75 which is attached to the cap 76 on the upper face of the casing 23$^b$; and it is normally held in pressure engagement with its seat by the coil spring 26$^b$ that is interposed between the said valve and the said cap. The inner side of the stud 72 is engaged by a plain guide bearing 77, which projects upward from the head of the valve 24$^b$, and is guided in its vertical movement by a roller 78 that is mounted on the cap 76. The half nut 74 is normally held in engagement with the stud 72 by means of a second roller 79 which is mounted on a U shaped bar 80 that is attached to the outer free end of a vapor thermostat 55$^b$—56$^b$, and is pressed inwardly by a spring 58$^b$ interposed between its head and an adjustable member 59$^b$ on the cap 76.

The operation of this automatic control device is functionally analogous to that of the previously described mechanisms. When no water is flowing the pressures on the opposite sides of the turbine element, 41$^b$, are the same; and the main fuel valve is then held to its seat by the tension of the spring 26$^b$. But as soon as a tap or other outlet, in the service pipe 40$^b$, is opened the pressure on the upper side of the member 41$^b$ is reduced and this member will be lifted; and will carry up with it the connected parts 72, 74 and 24$^b$, thereby allowing the gas to pass from the supply pipe 25$^b$ to the burner conduit 22$^b$. This initial opening of the valve 24$^b$ is effected without any rotation of the parts 41$^b$—42$^b$—72; and if the flow of water is stopped before its temperature rises to the predetermined point of thermostatic "cut off", the subsequent closure of the valve will also be effected by a nonrotative longitudinal, or "axial" movement of the turbine motor. But as soon as the flowing water is heated to the desired point the expansion of the thermostat bellows 56$^b$ will move the roller 79 away from the nut 74, and the latter will be thrown out of engagement with the screw 72 by the spring 81 that is interposed between the movable element 74 and the vertical guide member 77. This disengagement of the parts 72—74 will permit the valve 24$^b$ to be snapped shut by the spring 26$^b$, and will also allow the turbine driven members, 41$^b$—42$^b$—73—72, to be set in rotation by the flowing liquid. The valve 24$^b$ will remain closed—while the water continues to flow—until the drop in temperature is sufficient to permit the spring 58$^b$ to overcome the tension of the spring 81 and move the nut 74 back into working engagement with the rotating screw 72; whereupon the valve will be immediately raised until the collar 73 is brought into contact with the ends of the parts 74—77. The engagement of the last named elements will again arrest the rotary movement of the turbine 41$^b$, and the valve will be held in its fully opened position by the velocity pressure on the inlet side of this rotor member until the temperature is again raised to the point of thermal "cut off" or until the flow of water is stopped.

It will now be obvious, to those familiar with the water heater art, that the improved forms of construction which are herein described present numerous advantages; such, for example, as the very quick, reliable and economical control of the fuel supply (due to the substantially instantaneous opening or closing of the fuel supply valve whenever such action is required); the rapid and efficient absorption of the heat generated by the burning fuel—due to the very high ratio between the exposed heat absorbing surfaces of the wide thin spiral conduits (29—30 or 29$^a$) and the volume of water contained therein; the low first cost of the assembled structures (that results from the use of relatively few parts which can be made from cast metal or other low priced material, and which do not require any expensive machining or finishing operations); the mechanical reliability of these heaters in actual operation—because of the elimination of all closely fitted pistons, valves, and other unlubricated parts that tend to corrode or become clogged with sediment when the water in which they are immersed is impure or muddy—and the reduced expense of maintenance, which is due in part to the lower initial cost of the apparatus, in part to the economy of fuel consumption, and in part to the decreased repair and replacement charges. And with the preceding disclosure as a guide engineers and others familiar with the manufacture and use of this type of apparatus can readily utilize the various features of improvement which characterize my present invention in many forms of water heater construction that may differ in structural detail from those herein described. The several embodiments previously considered are, therefore, to be regarded as illustrative only; reference being had to the accompanying claims as more fully setting forth the scope and character of this development.

What I claim is:

1. In a water heater the combination of a fuel burner, a heating unit positioned above said burner, a fuel control valve, a reciprocable rotor member positioned in the path of the water flow through the said heating unit and adapted to be actuated by the said flow, and means for effecting the opening and closing movements of the said fuel valve by a combination of the reciprocating and rotary movements of the said member.

2. In a water heater the combination of a burner, a valve for controlling the supply of fuel thereto, a water conduit adapted to receive and absorb the heat from said burner, a thermostat and a flow actuated reciprocable rotor member positioned in the said conduit, and means for jointly utilizing the movements of said thermostat and of the said rotor to effect the opening and closing of the said fuel control valve.

3. In a water heater the combination of a burner, a fuel supply pipe connected thereto, a valve positioned in said pipe, a heating unit located in proximity to said burner, a thermostat and a flow actuated reciprocable rotor positioned in the path of water flow through said unit, and mechanism connecting said thermostat and said rotor to said valve and acting to successively open and close the latter whenever the flow is started and stopped and whenever the temperature of the flowing liquid fluctuates beyond predetermined limits.

4. In a water heater the combination of a burner, a valve for controlling the supply of fuel thereto, a heating unit positioned above said burner, a reciprocable rotor element positioned in the path of water flow through said unit and adapted to be operated by the said flow, mechanical connections actuated by the rotation of said element and acting to completely open or fully close the said valve when the water flow begins or stops, a thermostat in said heating unit, and means conjoining said thermostat and said rotor-valve connections whereby the latter are permitted to move the valve when the temperature of the flowing water rises above or falls below a predetermined point.

5. In a water heater the combination of a burner, a valve for controlling the supply of fuel thereto, a spring for normally holding said valve closed, a heating unit positioned above said burner, a rotor member located in the path of water flow through said unit and adapted to be both reciprocated and rotated by the said flow, means conjoining said rotor member with said valve and acting to move the latter to its open position and hold it therein when the flowing water is below a predetermined temperature, and other means for breaking the operative connection between said rotor and said valve when the water is heated above the said temperature.

6. In a water heater the combination of a heat absorbing unit, a heating element therefor, a valve for controlling the flow of the heating medium thereto; a spring for normally holding said valve in its closed position, a reciprocable rotor member actuated by the flow of liquid through the heating unit; connective mechanism conjoining said rotor with said valve, a thermostat positioned in the outlet passageway from said unit, and means conjoining said thermostat with said connective mechanism and acting to prevent its operation when the thermostat is heated above a predetermined temperature.

7. In a water heater the combination of a heat absorbing unit, a valve for controlling the supply of heat thereto, a reciprocable and rotatable motor actuated by the flow of liquid through said unit, a connection between said motor and said valve, and means for releasing said valve from said connections when the liquid is heated to a preadjusted temperature.

8. In a water heater the combination of a heat absorbing unit, means for supplying heat thereto, a valve for controlling said supply, a spring for normally holding said valve in closed position, reciprocable and rotatable motor actuated by the flow of water through said unit, means conjoining said motor with said valve and acting to open the latter when the flowing water is below a preadjusted temperature, and means for releasing said valve from said motor actuated means when the water is heated to said temperature.

9. In a water heater the combination of a heat absorbing member, a burner adjacent thereto, means for supplying fuel to said burner, a valve for controlling said fuel supply, a motor member adapted to be both reciprocated and rotated by the kinetic flow of liquid through the heater, means for operatively coupling said motor to said valve and opening the latter when the flowing liquid is below a predetermined temperature, a spring for resisting said opening movement, a thermostat positioned in the heat absorbing member, and means for uncoupling said motor from said valve and permitting the latter to be closed by said spring when the thermostat is heated to said predetermined temperature.

10. An apparatus for heating liquids which comprises the combination of a receptacle, means for producing a flow of fluid therethrough, means for heating said receptacle, a valve for controlling the supply of heat thereto, a reciprocable-rotor member adapted to be both reciprocated and rotated by the flow of liquid through said receptacle, and means conjoining said member and said valve and effecting a movement of the latter by a combination of the said reciprocative and rotative movements.

11. An apparatus for heating liquids which comprises the combination of a receptacle, means for producing a flow of fluid therethrough, means for applying heat thereto, means for controlling said heating means, a reciprocable-rotary motor adapted to be both reciprocated and rotated by the movement of the liquid in the said receptacle, a thermostat exposed to the action of the said liquid, and means conjoining the said motor and the said thermostat with the said heat controlling means and adapted to regulate the heat supply by the cooperative movements of the said motor and thermostat.

12. In a heating apparatus the combination of a receptacle, means for producing a flow of liquid therethrough, a motor member adapted to be both reciprocated and rotated by the said flow, means for supplying heat to the said receptacle, a thermostat positioned therein, and means conjoining said motor and said thermostat and adapted to control said heat supplying means by the coaction of the reciprocative and rotary movements of the said motor with the expansion and contraction of the said thermostat.

13. In an apparatus of the class described the combination of a receptacle, means for supplying fluid thereto and for withdrawing fluid therefrom, instrumentalities for applying heat to the said receptacle, a thermostat positioned therein, a reciprocating-rotary motor actuated by the withdrawal of the fluid from the receptacle, and mechanism conjoining said thermostat and said motor and acting to cooperatively control the said heating instrumentalities.

14. In a water heater the combination of a heat absorbing unit, a valve for controlling the supply of heat thereto, a motor member adapted to be successively reciprocated and rotated by the flow of fluid through the said unit, and connections between the said motor and the said valve whereby the latter can be operated by the successive reciprocation and rotation of the flow actuated motor.

15. In a water heater the combination of a receptacle, means for producing a flow of liquid therethrough, means for heating the said liquid, a valve for controlling the supply of heat thereto, a reciprocable rotary motor member positioned in the path of the flowing liquid, means conjoining the said valve and the said motor member and comprising a detachable clutch mechanism adapted to be intermittently operated by successive reciprocative and rotative movements of the motor member.

16. In an apparatus of the class described, the combination of a receptacle, means for producing an intermittent flow of fluid therethrough, means for supplying heat thereto, a valve for controlling the said supply of heat, a motor element positioned in the path of the flowing fluid and adapted to be first reciprocated and then rotated by the said flow, and connective mechanism conjoining the said motor and the said valve and adapted to control the position of the latter by the said successive reciprocation and rotation of the motor element.

17. In an apparatus of the class described the combination of a heat absorbing unit, a valve for controlling the supply of heat thereto, a reciprocable and rotatable motor element adapted to be actuated by the flow of fluid through said receptacle, a connective mechanism conjoining said motor and said valve and adapted to open the latter by the rotative movement of the motor, and locking mechanism adapted to be actuated by the reciprocative movement of the motor element and acting to prevent the operation of the said connective mechanism during predetermined phases of the heating operation.

18. An apparatus of the class described which comprises the combination of a heating receptacle, means for producing a flow of fluid therethrough, a valve for controlling the supply of heat thereto, a thermostat therein, a motor element adapted to be both reciprocated and rotated by the flow of fluid through the receptacle, and connective mechanism conjoining the said motor and the said thermostat with the said valve and adapted to control the operative position of the latter by the conjoint action of the expansive and contractive movements of the thermostat and of the reciprocative and rotative movements of the motor.

19. In a water heater the combination of a heating receptacle, means for producing an intermittent flow of fluid therethrough, means for controlling the supply of heat thereto, a thermostat therein, a motor adapted to be both reciprocated and rotated by the said intermittent flow of fluid, and connective mechanism conjoining said thermostat and said motor with said heat controlling means, and adapted to cooperatively regulate the action of the latter both by the intermittent flow of liquid through the receptacle and by the variation of the temperature therein substantially as described.

In testimony whereof I have hereunto set my hand.

FRANK L. O. WADSWORTH.